(12) United States Patent
Etonye

(10) Patent No.: US 10,654,448 B2
(45) Date of Patent: May 19, 2020

(54) VEHICLE SECURITY SYSTEM

(71) Applicant: Nzube John Etonye, West Covina, CA (US)

(72) Inventor: Nzube John Etonye, West Covina, CA (US)

(*) Notice: Subject to any disclaimer, the term of this patent is extended or adjusted under 35 U.S.C. 154(b) by 65 days.

(21) Appl. No.: 16/145,743

(22) Filed: Sep. 28, 2018

(65) Prior Publication Data

US 2019/0031146 A1    Jan. 31, 2019

Related U.S. Application Data

(63) Continuation-in-part of application No. 15/967,135, filed on Apr. 30, 2018, now Pat. No. 10,308,222,
(Continued)

(51) Int. Cl.
*B60R 25/10* (2013.01)
*B60R 25/30* (2013.01)
(Continued)

(52) U.S. Cl.
CPC .............. *B60R 25/305* (2013.01); *B60R 1/00* (2013.01); *B60R 1/04* (2013.01); *B60R 25/01* (2013.01); *B60R 25/042* (2013.01); *B60R 25/08* (2013.01); *B60R 25/104* (2013.01); *B60R 25/24* (2013.01); *B60R 25/25* (2013.01); *B60R 25/252* (2013.01); *B60R 25/255* (2013.01); *B60R 25/257* (2013.01); *B60R 25/31* (2013.01); *B60R 25/32* (2013.01); *B60R 25/33* (2013.01); *G06K 9/00832* (2013.01); *G07C 5/008* (2013.01); *G07C 9/00174* (2013.01); *G07C 9/00563* (2013.01); *H04N 7/181* (2013.01); *B60R 25/102* (2013.01); *B60R 25/1004* (2013.01); *B60R 2025/0405* (2013.01); *B60R 2025/0415* (2013.01); *B60R 2025/1016* (2013.01); *B60R 2300/105* (2013.01); *B60R 2300/302* (2013.01);
(Continued)

(58) Field of Classification Search
None
See application file for complete search history.

(56) References Cited

U.S. PATENT DOCUMENTS 10,157,384 B2 * 12/2018 Lesesky .............. G06Q 20/405
10,162,347 B2 * 12/2018 Shim .................... G05D 1/0016
(Continued)

*Primary Examiner* — Julie B Lieu
(74) *Attorney, Agent, or Firm* — Plager Schack LLP; Mark H. Plager; Michael J. O'Brien

(57) ABSTRACT

This invention relates to security systems. Previously, vehicle vandals and thieves were difficult to stop. Embodiments of the present invention use a vehicle security system (100) includes at least two image capture devices (ICD), sensors, a global positioning system tracking module (GPSTM), a control module (CM), and a monitoring device. The ICD are positioned at predetermined locations of the vehicle for capturing and transmitting images of a target object. The CM receives the captured images and sensor data variables. The CM analyzes the received images and sensor data variables based on predefined criteria to trigger auxiliary units. The CM transmits the images and sensor data variables based on the predefined criteria to the monitoring device. A graphical user interface displays the images for monitoring the vehicle and notifies the user.

74 Claims, 13 Drawing Sheets

Related U.S. Application Data which is a continuation of application No. 15/252,149, filed on Aug. 30, 2016, now Pat. No. 10,017,156.

(51) Int. Cl.

| | | |
|---|---|---|
| *B60R 25/31* | (2013.01) | |
| *B60R 25/32* | (2013.01) | |
| *B60R 25/33* | (2013.01) | |
| *B60R 1/00* | (2006.01) | |
| *B60R 25/042* | (2013.01) | |
| *B60R 25/08* | (2006.01) | |
| *B60R 25/104* | (2013.01) | |
| *B60R 1/04* | (2006.01) | |
| *G06K 9/00* | (2006.01) | |
| *H04N 7/18* | (2006.01) | |
| *B60R 25/24* | (2013.01) | |
| *G07C 9/00* | (2020.01) | |
| *B60R 25/25* | (2013.01) | |
| *B60R 25/01* | (2013.01) | |
| *G07C 5/00* | (2006.01) | |
| *B60R 25/04* | (2013.01) | |
| *B60R 25/102* | (2013.01) | |
| *G06K 9/22* | (2006.01) | |

(52) U.S. Cl.
CPC ........... *B60R 2300/8006* (2013.01); *B60R 2300/8073* (2013.01); *G06K 9/00006* (2013.01); *G06K 9/00288* (2013.01); *G06K 9/00617* (2013.01); *G06K 9/00771* (2013.01); *G06K 9/22* (2013.01); *G06K 2009/00738* (2013.01)

(56) References Cited

U.S. PATENT DOCUMENTS

| | | | | |
|---|---|---|---|---|
| 2014/0073254 | A1* | 3/2014 | Ichihara | G07C 5/008 455/41.2 |
| 2016/0306350 | A1* | 10/2016 | Shim | G05D 1/0016 |
| 2018/0056988 | A1* | 3/2018 | Heil, Jr. | E05F 15/70 |
| 2019/0122217 | A1* | 4/2019 | Lesesky | G06Q 20/405 |
| 2019/0174099 | A1* | 6/2019 | Hodge | G06Q 50/18 |

* cited by examiner

VEHICLE SECURITY SYSTEM

RELATED APPLICATION

This application is a continuation-in-part of non-provisional patent application U.S. Ser. No. 15/967,135 filed on Apr. 30, 2018 which is a continuation of non-provisional patent application U.S. Ser. No. 15/252,149 filed on Aug. 30, 2016, the entire contents of both applications is herein incorporated by reference.

BACKGROUND

The invention disclosed herein generally relates to security systems. More particularly, the invention disclosed herein relates to a vehicle security system for monitoring a vehicle and notifying a user based on the occurrence of an event.

Vehicle security systems in general refer to electronic systems installed on vehicles to prevent theft or tampering of a vehicle. Traditionally, vehicle security systems track or recover stolen vehicles only in certain conditions, for example, vehicles that have been subject to accidents, stripped, dismantled, etc., when police are notified as stolen by the vehicle owner, depending on the time frame of the stolen incident. Typically, the vehicle owners receive email or text messages an hour or more after the vehicle is moved. The time delay involved provides a head start for the burglar to get away with the crime. Furthermore, the delay may result in police personnel resorting to high-speed vehicle chases, which unnecessarily damage public property. A vehicle security system, which instantly notifies a user or police personnel of a probable vehicle theft, is required. Moreover, existing vehicle security systems do not provide instantaneous image feeds of an intrusion attempt. This prevents users from viewing who intrudes or steals their valuables inside the vehicle or the vehicle itself. Conventional vehicle security systems are unable to capture vehicle jackers live, directly in the process, especially when the door is opened. Alternately, children or a person related to the user may unintentionally trigger the alarm of the vehicle security system.

If video feed of the event is viewed by the owner on a monitoring electronic device, such false alarms can be avoided. A vehicle security system, which provides live image feeds of an intrusion attempt, is required. Existing vehicle security systems do not provide communication system between the vehicle owner and the suspect inside the vehicle. A vehicle system which provides instant communication system between the vehicle owner and the vehicle intruder is required. Furthermore, existing vehicle security systems do not prevent the vehicle from starting by the vehicle owner or an authorized representative. A vehicle security system, which prevents the vehicle from starting, by the vehicle owner or an authorized representative, is required. Existing vehicle security systems do not stop vehicles during a police pursuit. A vehicle security system, which stops the vehicle during a police chase by police request is required. Hence, there is a long felt but unresolved need for vehicle security system, which instantly notifies a user or police personnel of a probable vehicle theft. Furthermore, there is a need for vehicle security system, which provides live image feeds of an intrusion attempt. Moreover, there is a need for a vehicle security system, which prevents the vehicle from starting by the vehicle owner or authorized representative. Also, there is a need for a vehicle system which provides instant communication system between the vehicle owner and the vehicle intruder. Additionally, there is a need for a vehicle security system which provides a live video feeds of a suspect and a communication system between the local authority and a suspect inside a stolen moving vehicle. Furthermore, there is a need for a vehicle security system which stop a vehicle during a police chase by police request without fear of an accident.

SUMMARY

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The invention disclosed herein addresses the above-mentioned need for a vehicle security system, which instantly notifies a user or police personnel of a probable vehicle theft. Furthermore, the invention addresses a need for a vehicle security system, which provides live image feeds of an intrusion attempt. Moreover, the invention addresses a need for a vehicle security system, which prevents the vehicle from starting. The vehicle security system for monitoring a vehicle and notifying a user based on the occurrence of an event disclosed herein includes at least two image capture devices, sensors, a global positioning system tracking module, a control module, and a monitoring device. The image capture devices are positioned at predetermined locations of a vehicle for capturing and transmitting images of a target object. The sensors are configured to generate a plurality of sensor data variables based on a detection of the target object. The global positioning system tracking module generates and transmits signals based on a position of the vehicle to a monitoring device. The control module receives the captured images of the target object and the generated sensor data variables. The control module is configured to analyze the received images and the received sensor data variables based on predefined criteria to trigger auxiliary units. The control module transmits the received images and the sensor data variables based on the predefined criteria to the monitoring device. The monitoring device is configured to receive the transmitted images and the sensor data variables from the control module. A graphical user interface of the monitoring device displays the images and the sensor data variables for monitoring the vehicle and notifies the user based on the occurrence of the event.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
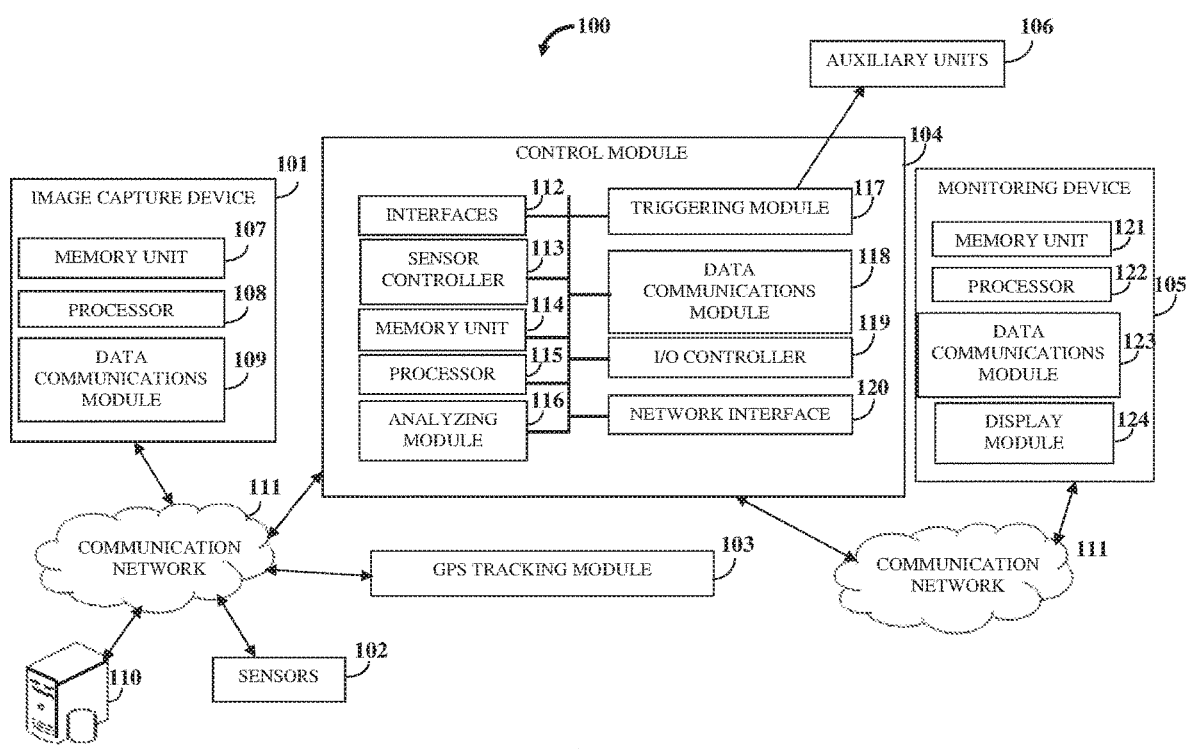
FIG. 1 exemplarily illustrates a schematic diagram of a vehicle security system.

FIG. 1 exemplarily illustrates a schematic diagram of a vehicle security system 100. The term vehicle is not limited to a traditional vehicle, but in various embodiments may consist of: a traditional vehicle, an autonomous vehicle, a robotic vehicle, an artificial intelligence vehicle, a vehicle used for ridesharing, an automobile used for or fleet management. The vehicle security system 100 for monitoring a vehicle and notifying a user based on the occurrence of an event disclosed herein includes at least two image capture devices 101, sensors 102, a global positioning system tracking module 103, a control module 104, and a monitoring device 105. The image capture devices 101 are positioned at predetermined locations of a vehicle for capturing and transmitting images of a target object. In an embodiment, an image capture device 101 is positioned underneath a dashboard area by the driver's side to capture images of a target object, for example, an intruder, a burglar, etc., if the target object tries to tamper with the ignition cables to start the vehicle. In an embodiment, an image capture device may be part of a rear view mirror or a dashboard mounted device secured on the top of the dashboard. In an embodiment, a second image capture device 101 is positioned to capture facial features of the target object. The sensors 102 are configured to generate a plurality of sensor data variables based on a detection of the target object. The global positioning system tracking module 103 generates and transmits signals based on a position of the vehicle to a monitoring device 105. The control module 104 receives the captured images of the target object and the generated sensor data variables.

In an embodiment, a third image capture device 101 is installed on the rear of the vehicle. The image capture device 101 comprises a microphone for usual driving recording. Moreover, the image capture device 101 connects to the monitoring device 105 via a communication network 111 that implements, for example, Bluetooth® connectivity, Wi-Fi connectivity, etc. The image capture device 101 records exterior and interior images of the vehicle during driving or when a motion of the target object is detected by motion sensors 102. In an embodiment, the rear-view image capture device 101 replaces the vehicle's existing rear view mirror. A live video stream from the image capture devices 101 can be viewed from the monitoring device 105. Furthermore, the user can interact with a monitoring device 105 of a person in the vehicle, for example, parents monitoring and cautioning their children if they receive a speeding alert.

The control module 104 is configured to analyze the received images and the received sensor data variables based on predefined criteria to trigger auxiliary units 106. The control module 104 transmits the received images and the sensor data variables based on the predefined criteria to the monitoring device 105. The monitoring device 105 is configured to receive the transmitted images and the sensor data variables from the control module 104. A graphical user interface of the monitoring device 105 displays the images and the sensor data variables for monitoring the vehicle and notifies the user based on the occurrence of the event. Each of the image capture devices 101 comprises a memory unit 107, a processor 108, and a data communications module 109. The memory unit 107 is configured to store the captured one or more images of the target object. The processor 108 is communicatively coupled to the memory unit 107. The processor 108 is configured to execute the computer program instructions defined by modules of the image capture device 101. In an embodiment, the modules of the image capture device 101 comprise the data communications module 109 configured to process and transmit the captured images of the target object to one of a control module 104 and a server 110 via a communication network 111.

In an embodiment, the memory unit of the image capture device 107, monitoring device 121, or control unit 114 may store or generate a user identification set. The server 110 may also hold, distribute or generate a user identification set. Identification can be made by any auxiliary unit 106, image capture device 101 or monitoring device 105. User authentication may originated from at least one member of a user identification set consisting of: an acoustic sound obtained by the microphone, a voice recognition obtained by the microphone, an iris recognition obtained by the first image capture device, a fingerprint recognition obtained by the first image capture device; facial recognition obtained by the first image capture device; a passcode obtained by the device. In an embodiment, the vehicle security system's control module 104 is programmed with further instructions to alert an occupant of the vehicle to verify an occupant identity when compared to the user identification set 370. The vehicle security system may then warning the occupant that the occupant identity was unverified. User's not identified 371 in the user identification set may result in the control module 114 to activate a kill switch passcode 375 or take no action at all 373.

In an embodiment, the control module 104 comprises one or more interfaces 112, a sensor controller 113, a memory unit 114, at least one processor 115, an analyzing module 116, a triggering module 117, a data communications module 118, an I/O controller 119, and a network interface 120. The memory unit 114 is configured to store the generated sensor data variables. The processor 115 is communicatively coupled to the memory unit 114. The processor 115 is configured to execute computer program instructions defined by modules of the control module 104. The data communications module 118 is configured to receive the generated sensor data variables from the sensors 102 and the transmitted images of the target object from the image capture devices 101. The analyzing module 116 is configured to dynamically analyze the received sensor data variables and the received images of the target object to recognize a state of the vehicle based on previously stored sensor data variables retrieved from the memory unit 114. The triggering module 117 is configured to trigger the auxiliary units 106 operably coupled to the monitoring device 105 via the interfaces 112 based on the recognized state of the vehicle. The data communications module 118 is further configured to receive activation signals from the monitoring device 105.

The multiple interfaces 112 connect the sensors 102 to the control module 104 of the vehicle security system 100. The multiple interfaces 112 are, for example, one or more bus interfaces, a wireless interface, etc. The network interface 120 connects the control module 104 to the communication network 111. As used herein, "bus interface" refers to a communication system that transfers data between components inside a computing device and between computing devices. As used herein, the "monitoring device" is an electronic device, for example, a personal computer, a tablet computing device, a mobile computer, a mobile phone, a smart phone, a portable computing device, a laptop, a personal digital assistant, a smart watch, a wearable device such as the Google Glass™ of Google Inc., the Apple Watch® of Apple Inc., etc., a touch centric device, a workstation, a server, a client device, a portable electronic device, a network enabled computing device, an interactive network enabled communication device, a gaming device, a set top box, a television, an image capture device, a web browser, a portable media player, a disc player such as a Blu-ray Disc® player of the Blu-ray Disc Association, a video recorder, an audio recorder, a global positioning system (GPS) device, a theater system, any entertainment system, any other suitable computing equipment, combinations of multiple pieces of computing equipment, etc.

In an embodiment, the electronic device is a hybrid device that combines the functionality of multiple devices. Examples of a hybrid electronic device comprise a cellular telephone that includes media player functionality, a gaming device that includes a wireless communications capability, a cellular telephone that includes game and electronic mail (email) functions, and a portable device that receives email, supports mobile telephone calls, has music player functionality, and supports web browsing. In an embodiment, computing equipment is used to implement applications such as media playback applications, for example, iTunes® from Apple Inc., a web browser, a mapping application, an electronic mail (email) application, a calendar application, etc. In another embodiment, computing equipment, for example, one or more servers are associated with one or more online services.

In another embodiment, the image capture devices 101, the sensors 102, the global positioning system (GPS) tracking module 103, and the monitoring device 105 are connected to the control module 104 via a communication network 111. The communications network 111 is a network, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

In an embodiment, the sensors 102 are, for example, proximity sensors, pressure sensors, temperature sensors, etc. The sensors 102 detect temperature, pressure, proximity, etc., of the target object. The sensors 102 generate multiple sensor data variables based on the temperature, pressure, proximity, etc., of the target object. In an embodiment, the sensors 102 detect the speed of the vehicle, extreme braking, mileage statistics, check engine light of the vehicle, receive vehicle's maintenance reminders, etc., and generates sensor data variables. The memory unit 114 stores the generated sensor data variables. The processor 115 is communicatively coupled to the memory unit 114. The processor 115 is configured to execute the computer program instructions defined by the modules of the control module 104 of the vehicle security system 100. The processors 108, 115, 122 refer to any one or more microprocessors, central processor (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 115 is implemented as a processor set comprising, for example, a programmed microprocessor and a math or graphics co-processor. The processor 115 is selected, for example, from the Intel® processors such as the Itanium® microprocessor or the Pentium® processors, Advanced Micro Devices (AMD®) processors such as the Athlon® processor, Ultra-SPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc.

The vehicle security system 100 disclosed herein is not limited to employing a processor 115. In an embodiment, the vehicle security system 100 employs a controller or a microcontroller. The processor 115 executes the modules, for example, 116, 117, 118, 119, etc., of the vehicle security system 100. The analyzing module 116 analyzes the generated sensor data variables to recognize a state of the vehicle based on existing sensor data variables stored in the memory unit 114. The triggering module 117 triggers one or more auxiliary units 106 based on the recognized state of the vehicle or an input received from a user via the I/O controller 119. The auxiliary units 106 are, for example, dashboard device, trunk locking device, internal trunk camera, external trunk camera, light sensor, gesture sensor, speed sensor, tachometer, acoustic sensor, iris sensor, image blurring sensor, barcode scanner, RFID reader, beacon reader, Bluetooth reader, proximity sensor, Bluetooth device, another vehicle, headlamps, indicator lamps, tail lamps of the vehicle, electric horns, air horns, braking device, ignition system, etc., of the vehicle. In an embodiment, the data communications module 118 is configured to transmit the generated sensor data variables to a server 110 via the communication network 111. This enables remote access to data regarding the state of the vehicle. In an embodiment, the triggering module 117 transmits the necessary signals to the one or more auxiliary units 111 in response to sensor data variables received from the sensing devices 102. A user may set predefined criteria for the control module 104 to trigger the one or more auxiliary units 111. In an embodiment, the graphical user interface of the monitoring device 105 provides preset options to notify the user. The notification is triggered based on crossing any one, some, or all of threshold data, for example, set minimum distance from the vehicle, etc.

In an embodiment, the monitoring device 105 comprises a memory unit 121, a processor, a data communications module 123, and a display module 124. The memory unit 121 is configured to store the generated sensor data variables. The processor 122 is communicatively coupled to the memory unit 121. In an embodiment, the processor 122 is configured to execute computer program instructions defined by modules of the monitoring device 105. In an embodiment, the modules of the monitoring device 105 comprise a data communications module 123 and a display module 124. The data communications module 123 is configured to receive the generated sensor data variables and the transmitted images of the target object from the data communication module 118 of the control module 104. The data communication module 123 receives the signals transmitted by the global positioning system (GPS) tracking module 103. The display module 124 is configured to instantaneously display the received images of the target object on the graphical user interface of the monitoring device 105. In some embodiments, the display module 124 independently or coupled to one or more monitoring devices 105 is configured to display that a passenger mobile device is monitoring a passenger compartment. The data communication module 123 is further configured to transmit the generated sensor data variables, the received GPS tracking module 103 signals, and an alert information based on the recognized state of the vehicle to a server 110 via a communication network 111.

In an embodiment, the server 110 is monitored by security personnel, for example, police personnel, etc. When a burglar or intruder opens or tampers with the vehicle, the auxiliary units 106 are triggered by the control module 104 and notifies the monitoring device 105 of the user by streaming images of the intruder on the graphical user interface. If the intruder is known to the user, the auxiliary units 106 are turned off. Alternately, the user then instantly reports the incident to the concerned security personnel who immediately track down the vehicle. In an embodiment, one of the auxiliary units 106 is a braking device or an ignition system of the vehicle. The user or a third party additionally activates the braking device to stop the vehicle at police request to apprehend the intruder without high speed chase and fear of accident. Alternately, the ignition system is deactivated to prevent the vehicle from starting. In an embodiment, the auxiliary unit 106 is a fuel cut-off device. The user or a third party activates the fuel cut-off device to cut the vehicle's fuel/gas and stop the vehicle at police request.

Also, the vehicle's emergency lights automatically turn on when any of the auxiliary units 106 is activated, for safety reason which alerts the police when to slow down on a vehicle pursuit. Furthermore, in a situation where there is a network failure, for example, at an underground parking lot, etc., and the intruder takes off with the vehicle, the vehicle security system 100 picks up the signal, notifies the police personnel via the server 110, tracks down and stops the vehicle by police request through the monitoring staff. Police personnel can also know if the suspect is armed or not through the video. In an embodiment, the vehicle security system 100 locks or unlocks the vehicle from the monitoring device 105 via the control module 104. In an embodiment, the vehicle automatically locks if the vehicle key in not detected by the ignition after few minutes of being unlocked via the control module 104 of the vehicle security system 100. In another embodiment, the vehicle security system 100 starts the vehicle from the monitoring device 105 via the control module. In another embodiment, the vehicle security system 100 operates the vehicle's air conditioning system from the monitoring device 105 through the control module 104.

Figure 2:
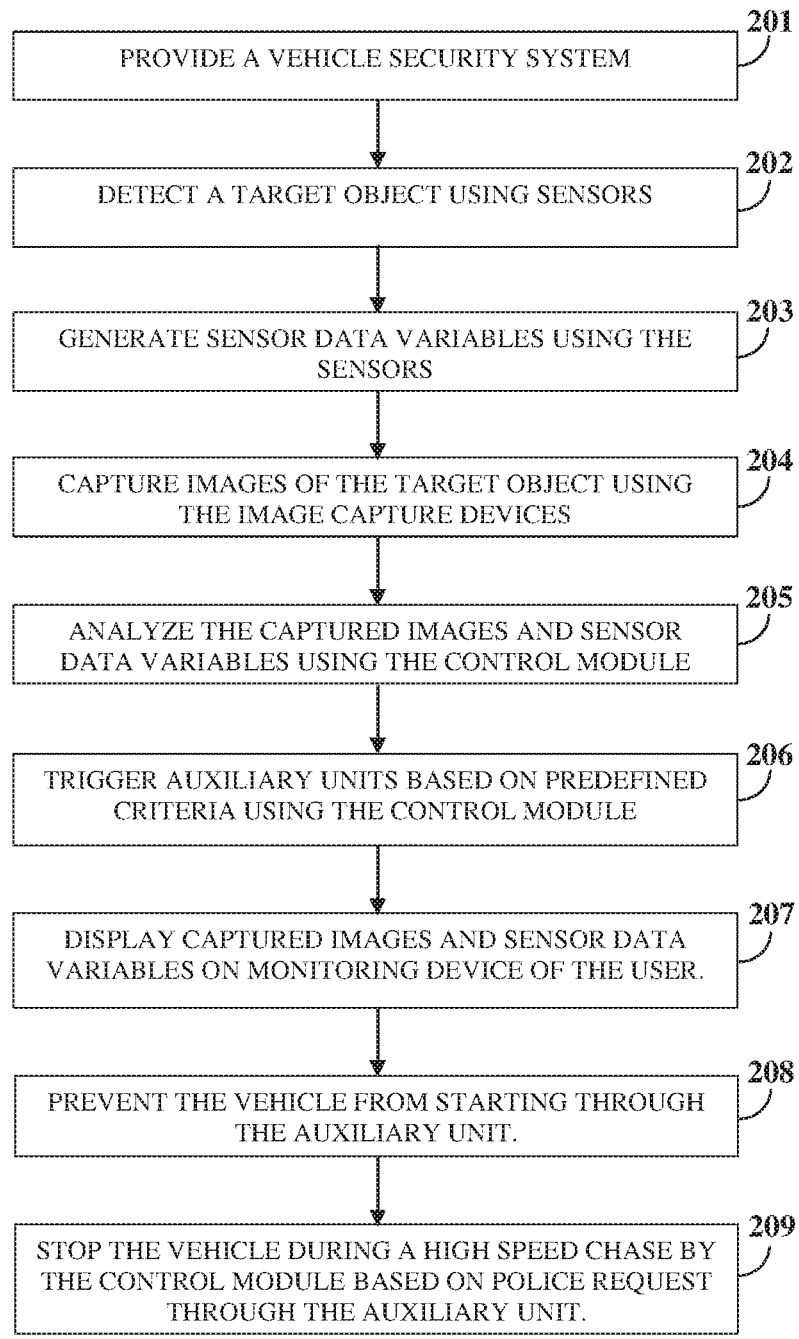
FIG. 2 exemplarily illustrates a method for monitoring a vehicle and notifying a user based on the occurrence of an event.

FIG. 2 exemplarily illustrates a method for monitoring a vehicle and notifying a user based on the occurrence of an event. In the method, disclosed herein, a vehicle security system 100 comprising at least two image capture devices 101, sensors 102, a global positioning system (GPS) tracking module 103, a control module 104, and a monitoring device 105, is provided 201. The image capture devices 101 are positioned at predetermined locations of the vehicle. A target object is detected 202 using the sensors. Sensor data variables are generated 203 using the sensors. Images of the target object are captured 204 using the image capture devices 101. The captured images and sensor data variables are analyzed 205 using the control module 104. One or more auxiliary units 106 are triggered 206 based on predefined criteria using the control module 104. The captured images and sensor data variables are displayed 207 on a graphical user interface of the monitoring device 105 of the user. The vehicle is prevented 208 from starting by the one or more auxiliary units 106. Moreover, the vehicle is stopped 209 during a high speed chase by the control module 104 based on police request through the auxiliary units 106.

The foregoing examples have been provided merely for the purpose of explanation and are in no way to be construed as limiting of the vehicle security system 100, disclosed herein. While the vehicle security system 100 has been described with reference to various embodiments, it is understood that the words, which have been used herein, are words of description and illustration, rather than words of limitation. Further, although the vehicle security system 100 has been described herein with reference to particular means, materials, and embodiments, the vehicle security system 100 is not intended to be limited to the particulars disclosed herein; rather, the vehicle security system 100 extends to all functionally equivalent structures, methods and uses, such as are within the scope of the appended claims. Those skilled in the art, having the benefit of the teachings of this specification, may affect numerous modifications thereto and changes may be made without departing from the scope and spirit of the vehicle security system 100 disclosed herein in their aspects.

Figure 3:
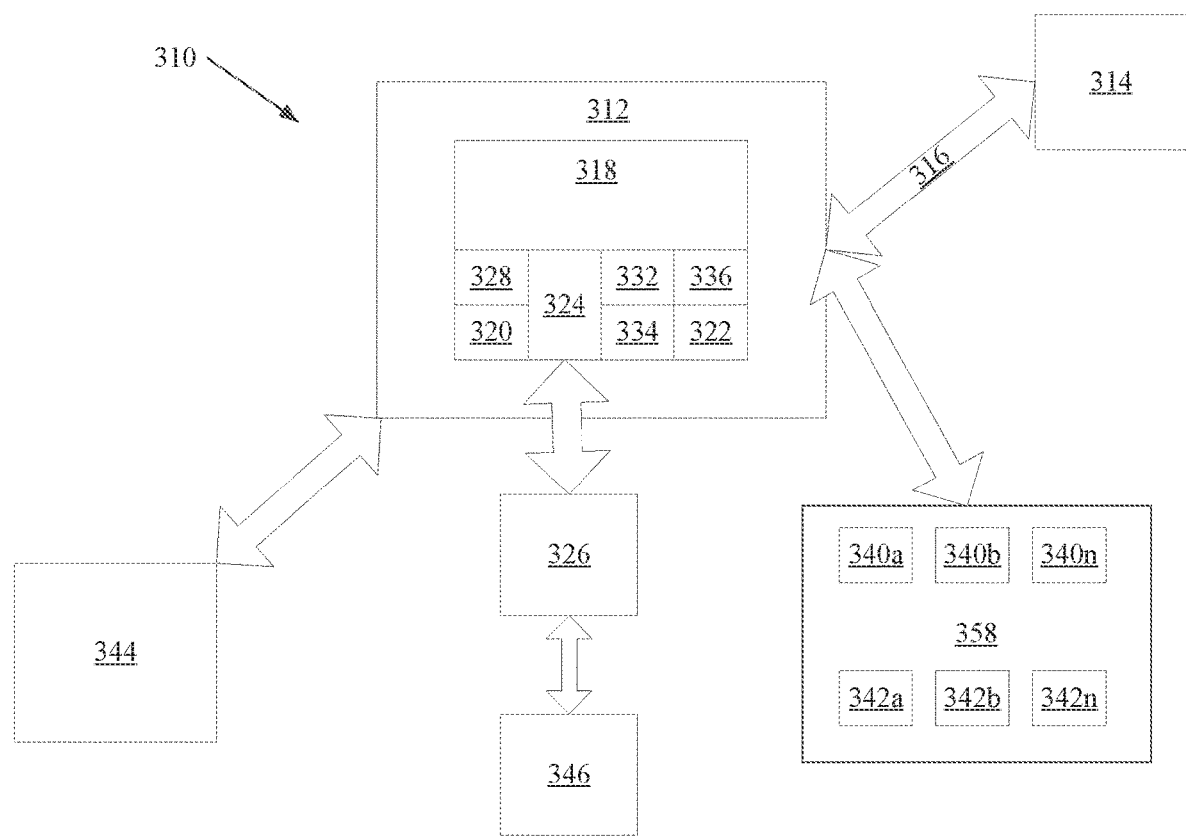
FIG. 3 exemplarily illustrates a schematic diagram of a vehicle security system.
Figure 4:
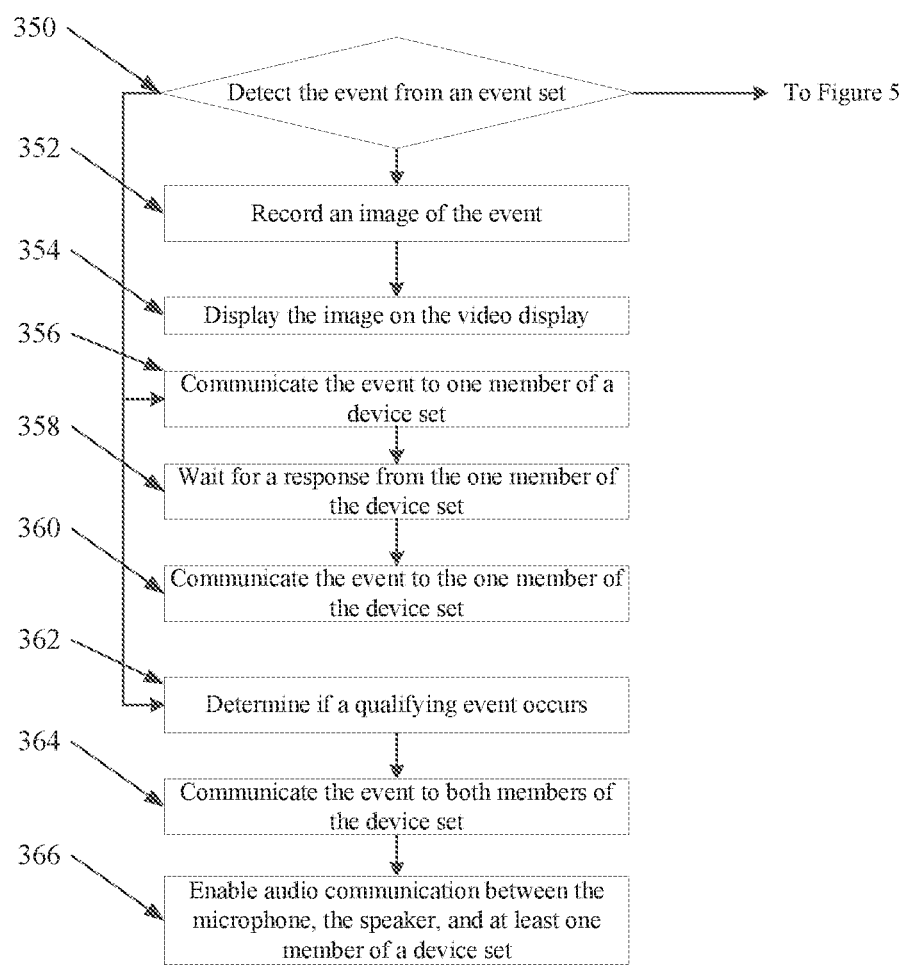
FIG. 4 exemplarily illustrates a method for monitoring a vehicle and notifying a user based on the occurrence of an event.
Figure 5:
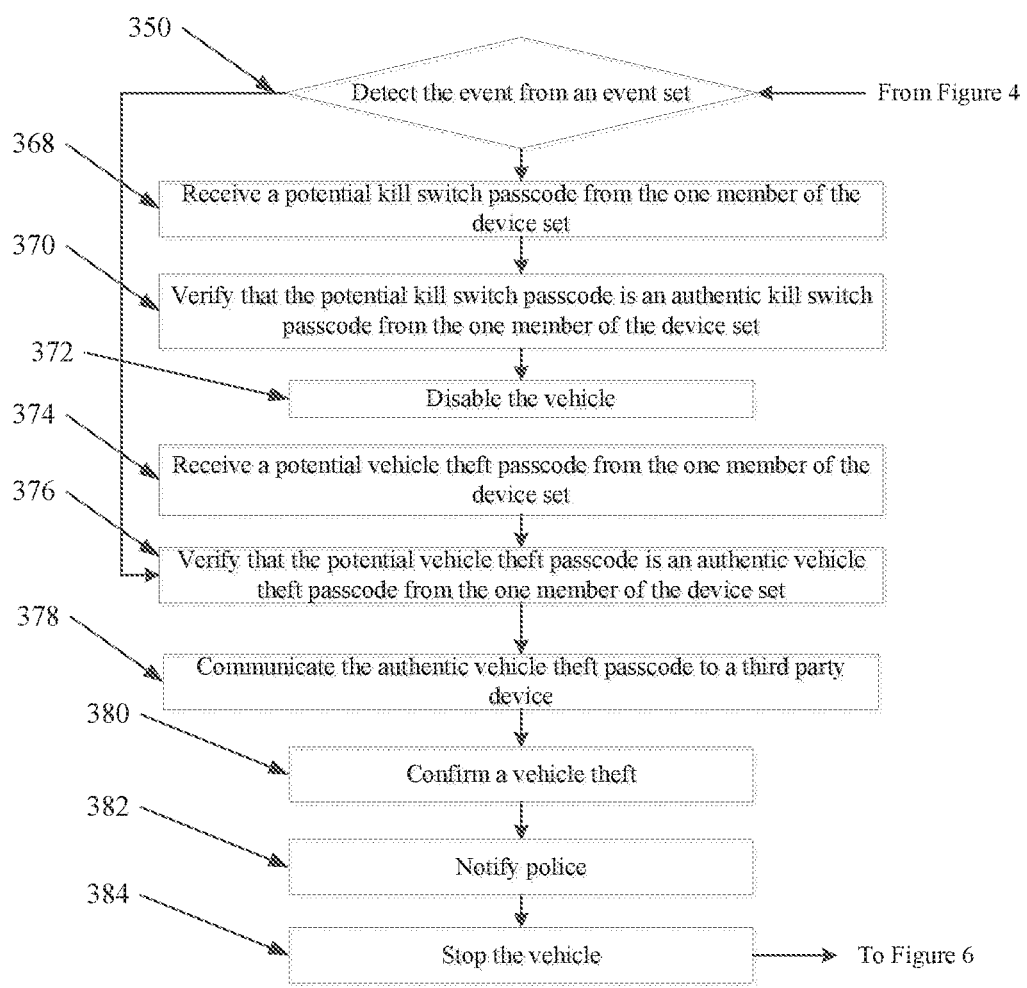
FIG. 5 exemplarily illustrates a method for monitoring a vehicle and notifying a user based on the occurrence of an event.
Figure 6:
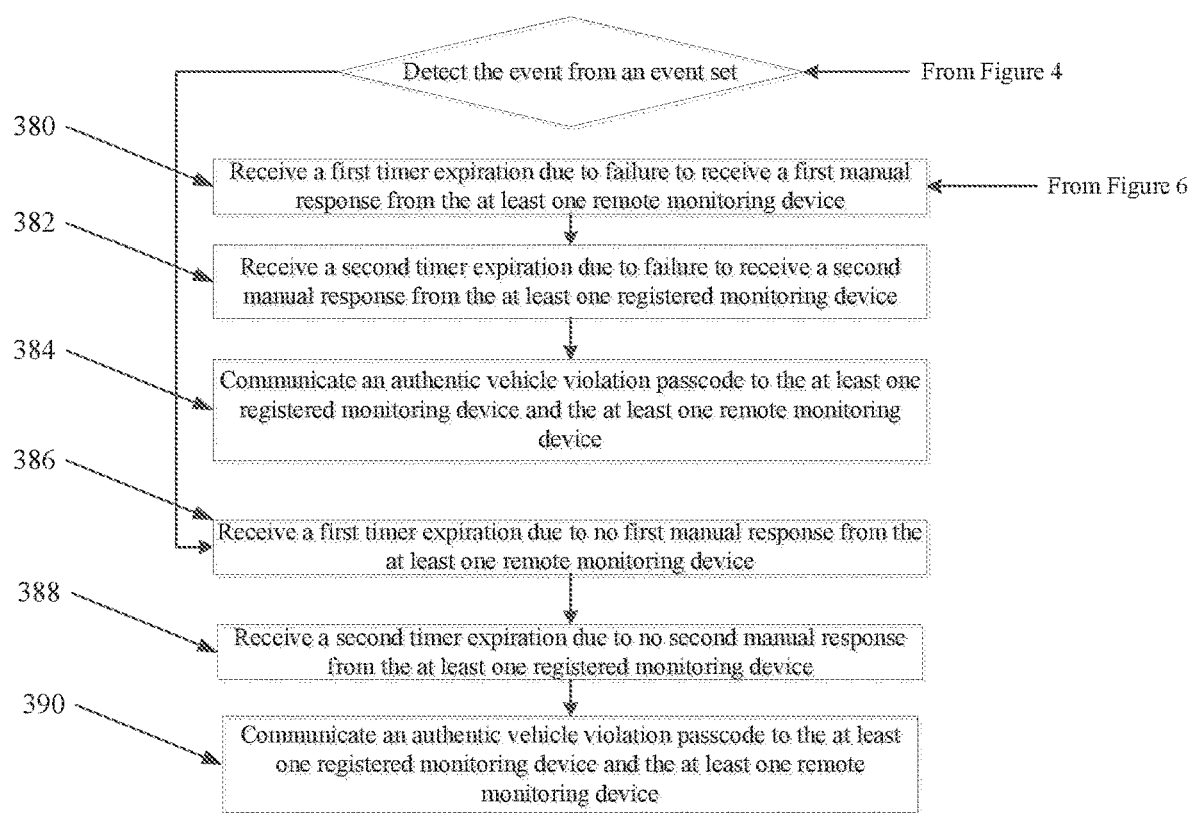
FIG. 6 exemplarily illustrates a method for monitoring a vehicle and notifying a user based on the occurrence of an event.
Figure 7:
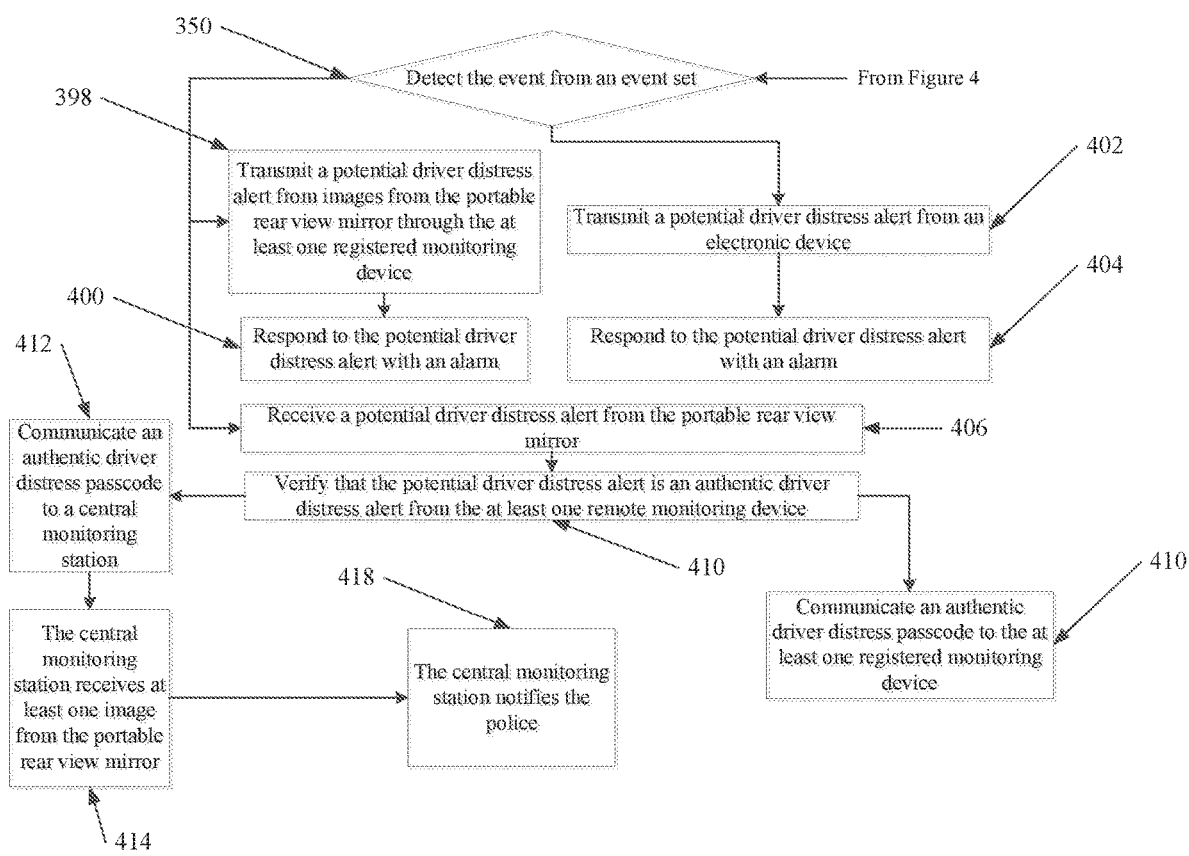
FIG. 7 exemplarily illustrates a method for monitoring a vehicle and notifying a user based on the occurrence of an event.
Figure 8:
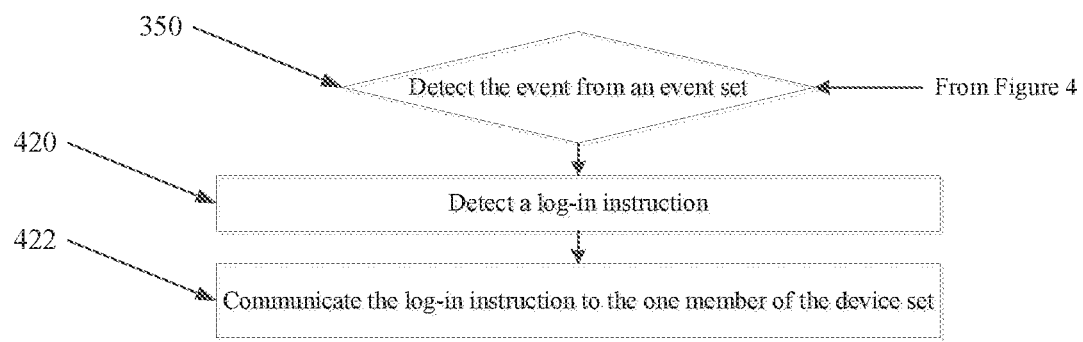
FIG. 8 exemplarily illustrates a method for monitoring a vehicle and notifying a user based on the occurrence of an event.
Figure 9:
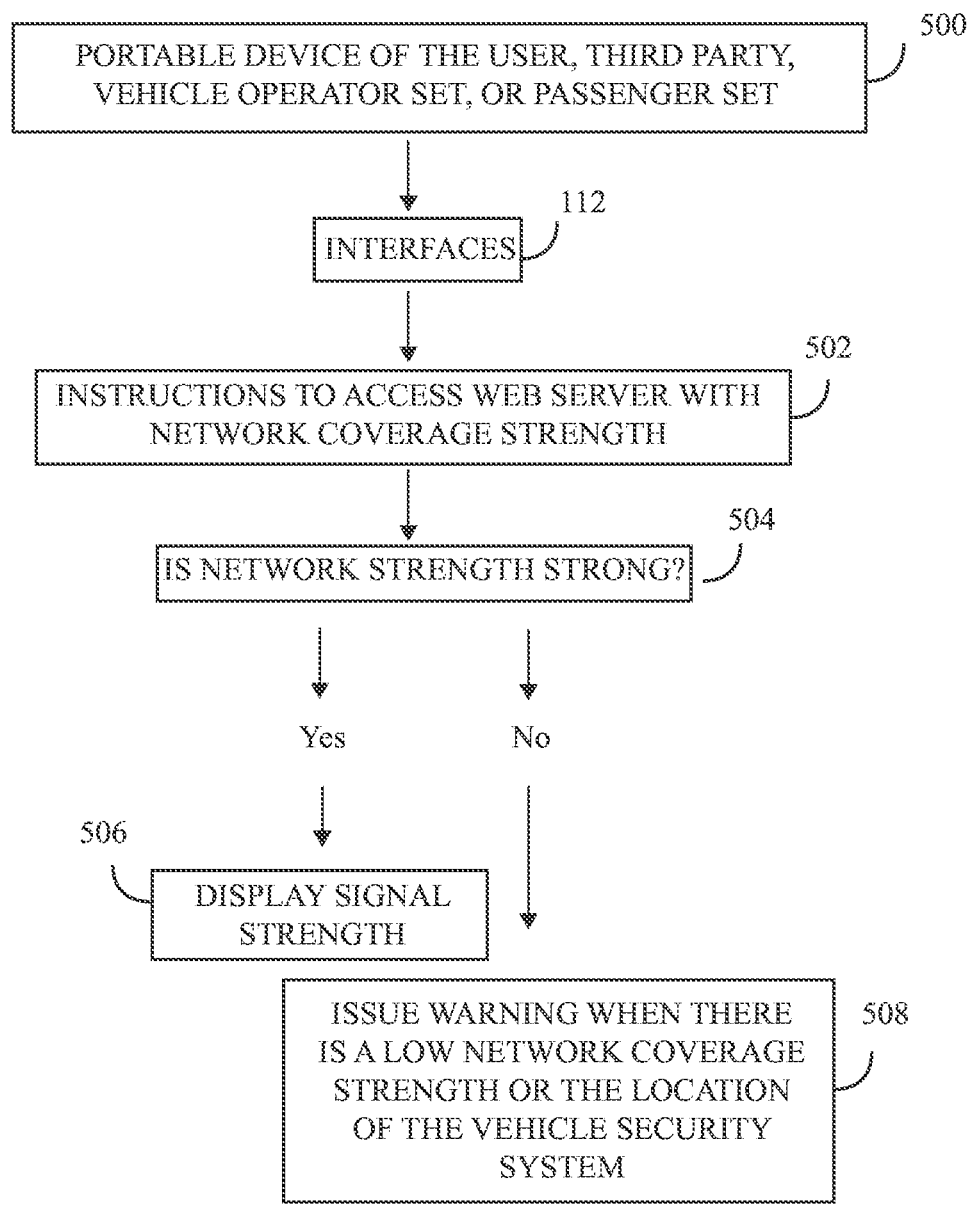
FIG. 9 exemplarily illustrates a method for monitoring a vechicle and notifying a user based on the occurence of an event.
Figure 10:
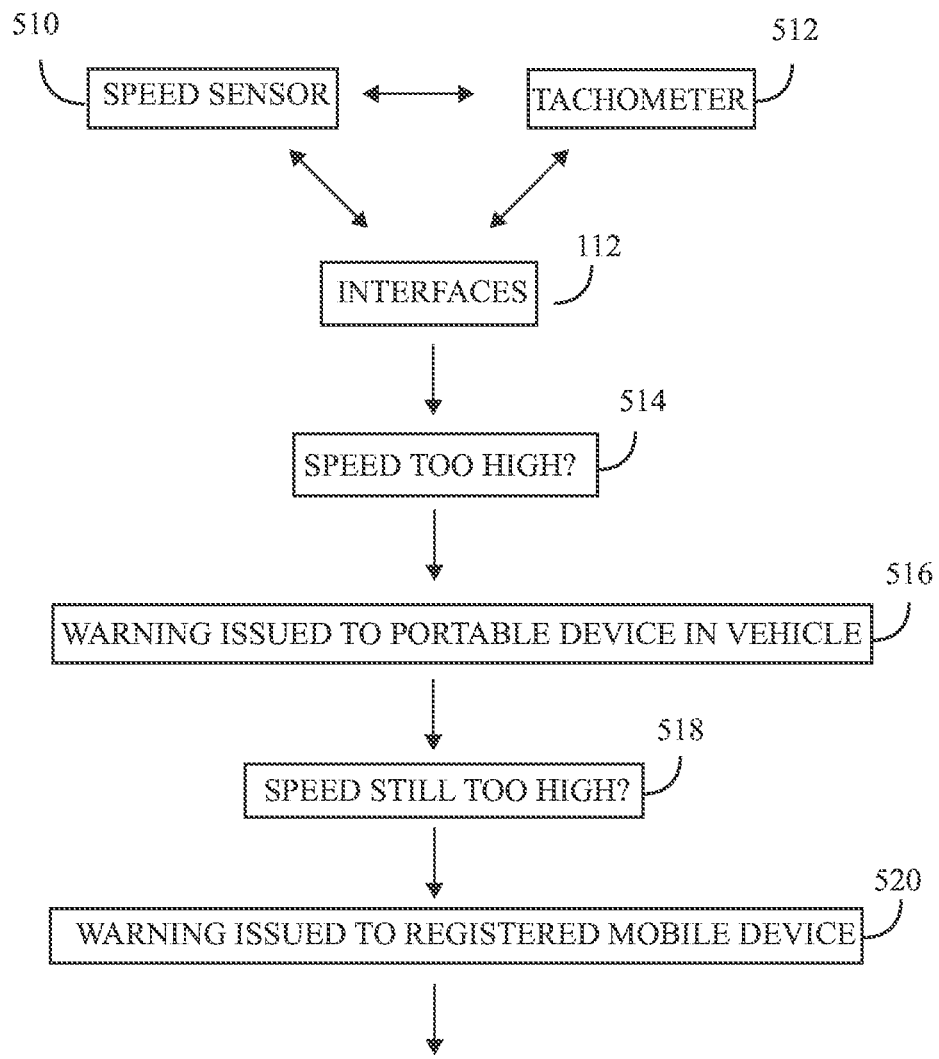
FIG. 10 exemplarily illustrates a method for monitoring a vechicle and notifying a user based on the occurence of an event.
Figure 11:
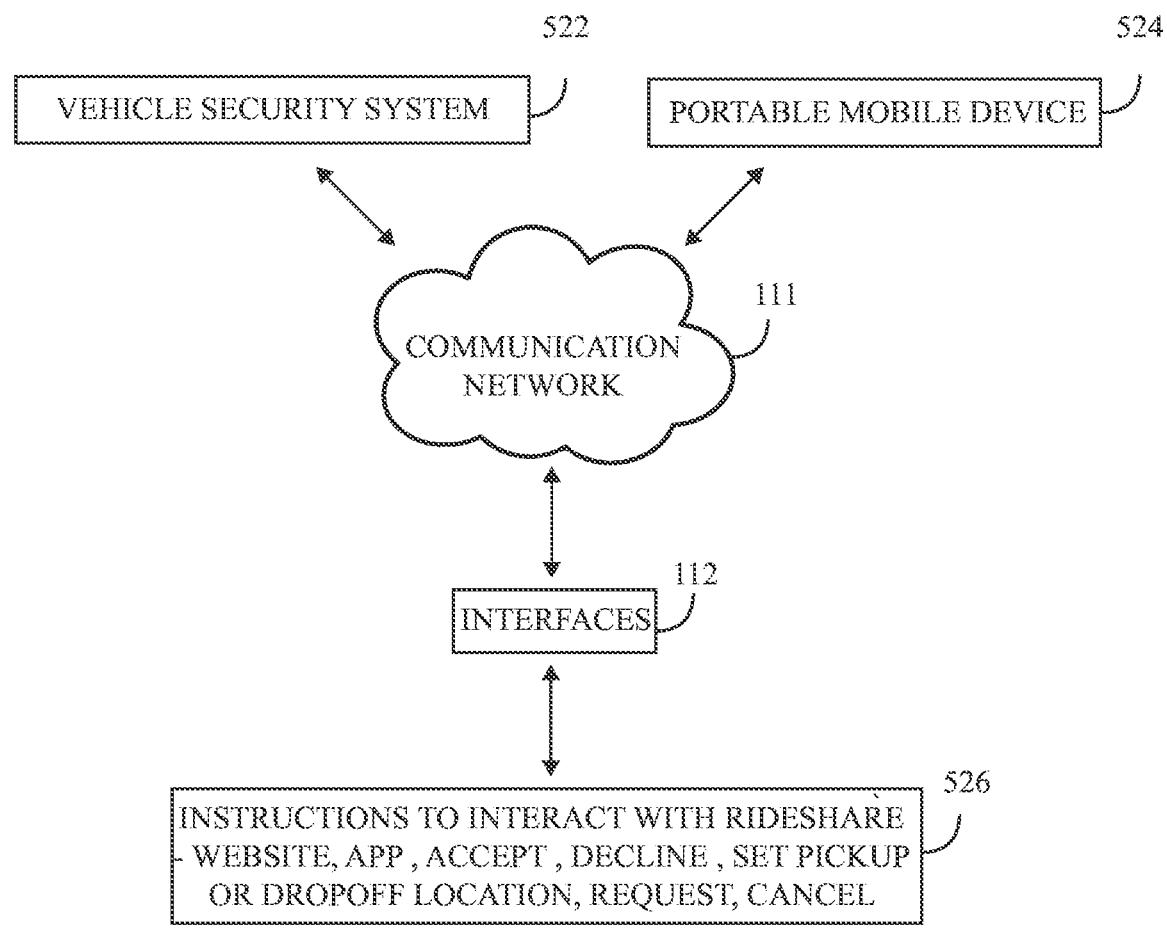
FIG. 11 exemplarily illustrates a method for monitoring a vechicle and notifying a user based on the occurence of an event.
Figure 12:
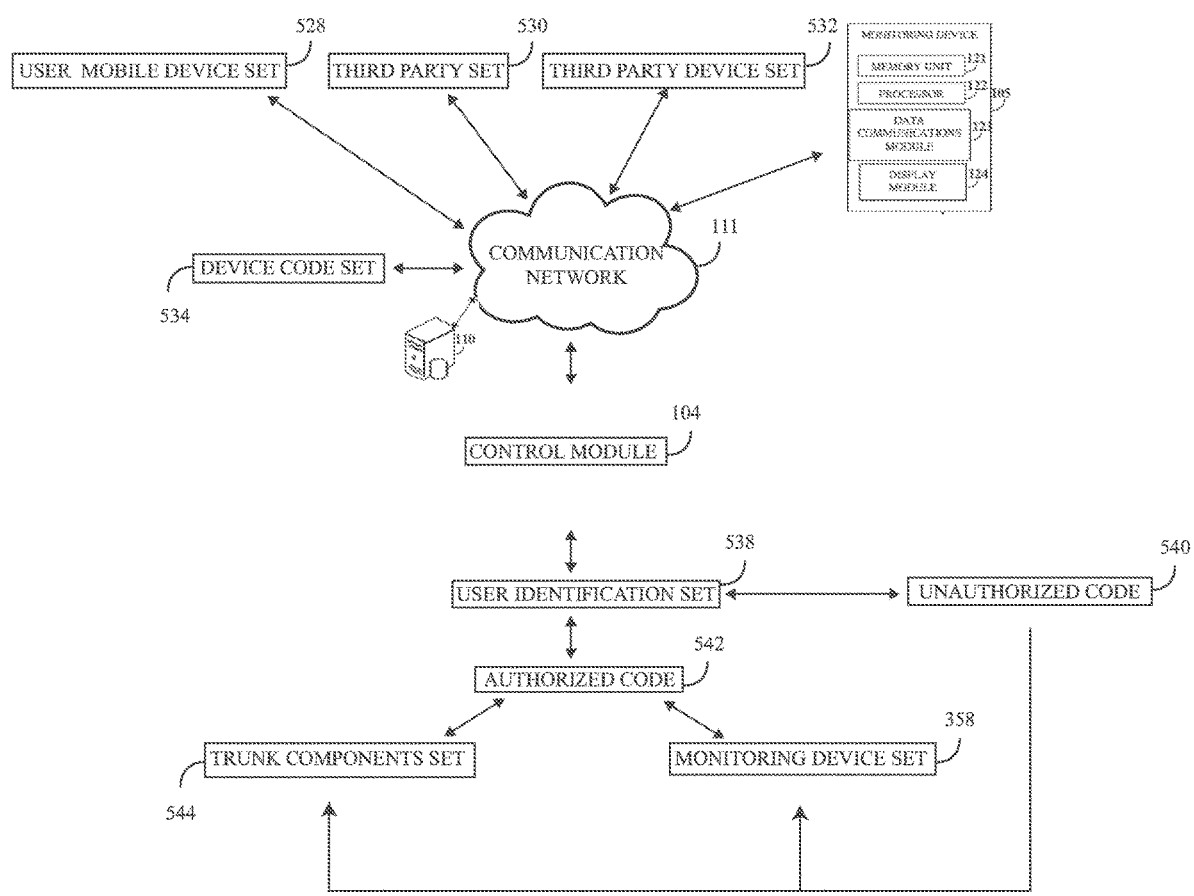
FIG. 12 exemplarily illustrates a method for monitoring a vechicle and notifying a user based on the occurence of an event.
Figure 13:
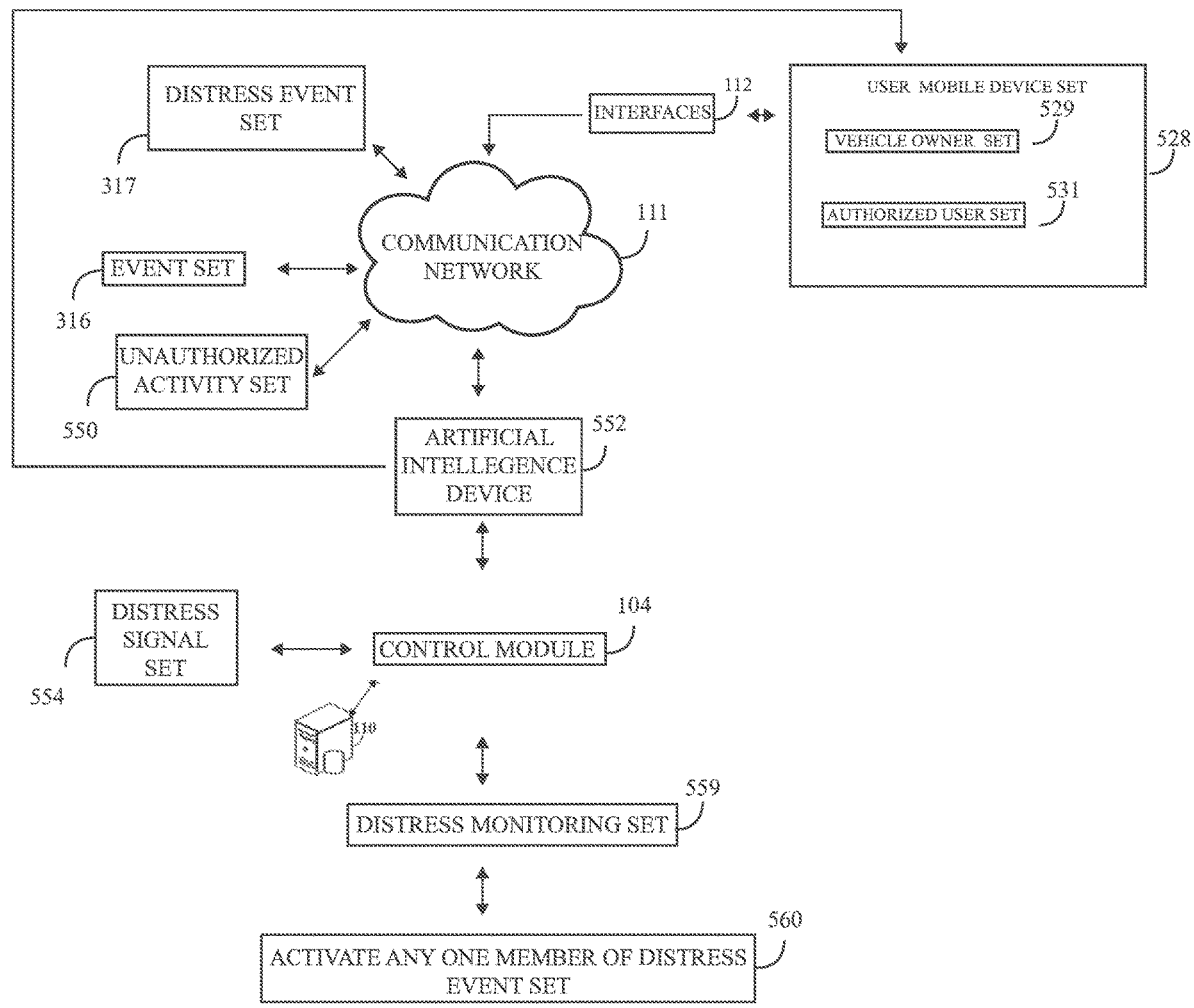
FIG. 13 exemplarily illustrates a method for monitoring a vechicle and notifying a user based on the occurence of an event.

Turning to FIG. 3, a vehicle security system 310 for monitoring a vehicle 312 and notifying a user 314 based on an occurrence of an event 316 includes a portable rear view mirror 318 having a portable rear view mirror front side 320 and a portable rear view mirror rear side 322 and a microprocessor 324 therebetween. A control module 326 is communicatively coupled to the microprocessor 324.

A first image capture device 328 is attached to the portable rear view mirror front side 320 and communicatively coupled to the microprocessor 324. A second image capture device 330 is attached to the portable rear view mirror rear side 322 and communicatively coupled to the microprocessor 324. A microphone 332 is attached to the portable rear view mirror rear side 322 and communicatively coupled to the microprocessor 324. A speaker 334 is attached to the portable rear view mirror rear side 322 and communicatively coupled to the microprocessor 324. A remote communication transmitter 336 is attached to the portable rear view mirror rear side 322 and communicatively coupled to the microprocessor 324. A video display 338 is arranged within the portable rear view mirror 318. The remote communication transmitter 336 is communicatively coupled at least one remote monitoring device 340a, 340b . . . 340n and at least one registered monitoring device 342a, 342b . . . 342n. As used in this application a remote monitoring device is defined as one member of a set of electronic devices owned and operated by the vehicle owner, such as vehicle key fob, remote control, a personal computer, a tablet computing device, a mobile computer, a mobile phone, a smart phone, a portable computing device, a laptop, a personal digital assistant, a smart watch, a wearable device such as the Google Glass™ of Google Inc., the Apple Watch® of Apple Inc., etc., a touch centric device, a workstation, a server, a client device, a portable electronic device, a network enabled computing device, an interactive network enabled communication device, a gaming device, a set top box, a television, an image capture device, a web browser, a portable media player, a disc player such as a Blu-ray Disc® player of the Blu-ray Disc Association, a video recorder, an audio recorder, a global positioning system (GPS) device, a theater system, any entertainment system, any other suitable computing equipment, combinations of multiple pieces of computing equipment, etc. As used in this application a registered monitoring device is defined as at least one member of a set of electronics devices added or registered by the vehicle owner but used or monitored by the vehicle owner family relation, vehicle owner associate, authorized vehicle user, and a central security monitoring station, such as vehicle key fob, remote control, a personal computer, a tablet computing device, a mobile computer, a mobile phone, a smart phone, a portable computing device, a laptop, a personal digital assistant, a smart watch, a wearable device such as the Google Glass™ of Google Inc., the Apple Watch® of Apple Inc., etc., a touch centric device, a workstation, a server, a client device, a portable electronic device, a network enabled computing device, an interactive network enabled communication device, a gaming device, a set top box, a television, an image capture device, a web browser, a portable media player, a disc player such as a Blu-ray Disc® player of the Blu-ray Disc Association, a video recorder, an audio recorder, a global positioning system (GPS) device, a theater system, any entertainment system, any other suitable computing equipment, combinations of multiple pieces of computing equipment, etc.

Alternately, a communication system 344 can be communicatively coupled to the microprocessor 324 and further comprising the microphone 332, the speaker 334, the at least one remote monitoring device 340a, 340b . . . 340n and the at least one registered monitoring device 342a, 342b . . . 342n. As used in this application a communication system 344 is defined as . . . a visual and auditory communication. Additionally, the control module 326 can be communicatively coupled to an auxiliary unit 346. As used in this application an auxiliary unit is defined as a system that either can stop the vehicle or prevent the vehicle from starting such as one member of the set comprising: braking system of the vehicle, an ignition system of the vehicle, a fuel cut-off system, and similar systems.

The microprocessor 324 is programmed to communicate to the control module 326 with instructions to, at step 350, detect the event 316 from an event set. The event set consists of: a vehicle theft attempt, a burglary attempt, an intruder attempt, a vehicle jacking attempt, a driver before driving insecurity, a driver while driving insecurity, and a driver after driving insecurity. As used in this application a driver insecurity is defined as potential robbery attack of the driver close the vehicle, for example at a parking lot; potential vehicle jacking attempt, robbery attempt, rape attempt, or any threatening attempt of the vehicle driver before, during and after driving with unknown person, for example a taxi driver with unknown passenger.

The microprocessor 324 is programmed to communicate to the control module 326 with instructions to, at step 352, to record an image of the event. The microprocessor 324 is programmed to communicate to the control module 326 with instructions to, at step 354, to display the image on the video display 338.

The microprocessor 324 is programmed to communicate to the control module 326 with instructions to, at step 356, communicate the event 316 to one member of a monitoring device set 358 consisting of: the at least one remote monitoring device 340a, 340b . . . 340n and the at least one registered monitoring device 342a, 342b . . . 342n.

The microprocessor 324 is programmed to communicate to the control module 326 with instructions to, at step 357, wait for a response from the one member of the monitoring device set. Then to, at step 360, communicate the event to the one member of the monitoring device set. In some embodiments, communicating the event to the one member of the monitoring device set further comprises producing an emergency tone.

In some embodiments, the control module 326 is located on the vehicle 312 and programmed with more instructions to, at step 362, determine if a qualifying event occurs. Then, to, at step 364, communicate the qualifying event to both members of the monitoring device set. The qualifying event is one member of a qualifying event set consisting of: unlocking the vehicle, locking the vehicle, and starting the vehicle.

In some embodiments, the control module 326 is further programmed with more instructions to, at step 366, enable audio communication between the microphone, the speaker, and at least one member of a remote set consisting of: the at least one remote monitoring device, the at least one registered monitoring device, a central security monitoring station, a police station, and a local authority station.

In some embodiments, the microprocessor 324 is further programmed to communicate to the control module 326 with more instructions to, at step 368, receive a potential kill switch passcode from the one member of the monitoring device set. The kill switch passcode may be generated from the auxiliary members, at step 368, and may comprise at least one of the following: a passcode of any kind, biometric data, a password, a fingerprint, an iris print, an acoustic sound, a face recognition result from at least one member of a monitoring set consisting of: the portable device, a monitoring device, a registered monitoring device and a central monitoring station. Then, at step 370, to verify that the potential kill switch passcode is an authentic kill switch passcode from the one member of the monitoring device set. Finally, at step 372, to disable or start the vehicle. As used in this application a kill switch passcode is defined as a passcode that permits disabling, preventing or stopping a vehicle from starting by inputting an authorization secret code to execute the command. The kill switch passcode is created by at least one member of the passcode set. The kill switch passcode is authenticated by the control module 326. The kill switch is programmed to disable or stop the vehicle from starting through a monitoring device. The kill switch is connected to the auxiliary unit on the vehicle by through the control module. When the kill switch pass code is authenticated the kill switch disables the vehicle.

In some embodiments, the microprocessor 324 is further programmed to communicate to the control module 326 with more instructions to, at step 374, receive a potential vehicle theft passcode from the one member of the monitoring device set. Then, at step 376, to verify that the potential vehicle theft passcode is an authentic vehicle theft passcode from the one member of the monitoring device set. After that, at step 378, to communicate the authentic vehicle theft passcode to a third party device. The third party device is programmed with further instructions to, at step 380, confirm a vehicle theft. A vehicle theft can be determined through the vehicle rear view mirror image capturing device, additionally, a vehicle owner, an authorized user, or a third party can communicate with the vehicle occupant using the speaker and the microphone. Then, at step 382, to notify police.

In some embodiments, the microprocessor 324 is further programmed to communicate to the auxiliary unit 346 through the control module 326 with the instructions to, at step 384, stop a moving stolen vehicle through a central security monitoring station with police supervision.

In some embodiments, the microprocessor 324 is further programmed to communicate to the control module 326 with added instructions to, at step 386, receive a first timer expiration due to failure to receive a first manual response from the at least one remote monitoring device. Then, at step 388, to receive a second timer expiration due to failure to receive a second manual response from the at least one registered monitoring device. After that, at step 390, to communicate an authentic vehicle violation passcode to the at least one registered monitoring device and the at least one remote monitoring device. The authentic vehicle violation passcode is one member of a passcode set consisting of: a vehicle theft passcode, a vehicle burglary passcode, and a vehicle theft attempt pass code.

In some embodiments, the microprocessor 324 is further programmed to communicate to the control module 326 with more instructions to, at step 392, receive a first timer expiration due to no first manual response from the at least one remote monitoring device. Then, at step 394, receive a second timer expiration due to no second manual response from the at least one registered monitoring device. Following that, at step 396, to communicate an authentic vehicle violation passcode to the at least one registered monitoring device and the at least one registered monitoring device.

In some embodiments, the microprocessor 324 is further programmed to communicate to the control module 326 with more instructions to, at step 398, transmit a potential driver distress alert from an electronic device. Then, at step 400, to respond to the potential driver distress alert with an alarm.

In some embodiments, the microprocessor 324 is further programmed to communicate to the control module 326 with more instructions to, at step 402, transmit a potential driver distress alert from images from the portable rear view mirror through the at least one registered monitoring device. Then, at step 404, to respond to the potential driver distress alert with an alarm.

In some embodiments, the microprocessor 324 is further programmed to communicate to the control module 326 with more instructions to, at step 406, receive a potential driver distress alert from the portable rear view mirror. Then, at step 408, verify that the potential driver distress alert is an authentic driver distress alert from the at least one remote monitoring device.

In some embodiments, the microprocessor 324 is further programmed to communicate to the control module 326 with more instructions to, at step 410, communicate an authentic driver distress passcode to the at least one registered monitoring device.

In some embodiments, the microprocessor 324 is further programmed to communicate to the control module 326 with more instructions to, at step 412, communicate an authentic driver distress passcode to a central monitoring station.

In some embodiments, the central monitoring station, at step 414, receives a communication of the authentic driver distress passcode from the portable rear view mirror and notifies police at step 418. Then, at step 416, the central monitoring station receives at least one image from the portable rear view mirror and notifies the police at step 418.

In some embodiments, the microprocessor 324 is further programmed to communicate to the control module 326 with more instructions to, at step 420, detect a log-in instruction. Then, at step 422, to communicate the log-in instruction to the one member of the monitoring device set.

In some embodiments, the vehicle security system may include a trunk components set 544 or monitoring device set 358 connected over the communication network 111 with the control module 104 to control various actions. The monitoring device set 548 consisting of: the portable device, a monitoring device, a registered monitoring device and a central monitoring station. The truck components set 544 may comprise of: an internal trunk camera, an external trunk camera, gesture sensor, light sensor, microphone, speaker, barcode scanner, RFID reader, Bluetooth scanner, proximity sensor, iris scanner, acoustic sensor, auxiliary members or trunk locking device. In some embodiments, at least one camera is equipped with night vision to clearly see inside the vehicle trunk when closed. Then, devices used to activate any action of the trunk components set 548 can be created by the web server 110, user mobile device set 528 or third party set 530, or third party device set 532 and attached to the package or independently in possession of the user. The generated command barcode may be also printed on a label with further information comprising: a vehicle make, a vehicle model, a license plate, a color, and a location of the vehicle. The vehicle security system's control module 104 or web server 110 can be programmed to generate an authenticated command when successfully compared to the user identification set 538 and the authorized security system can generate, transmit or terminate an authorized command code 542 or pin to manually or automatically unlock, open, close or lock a vehicle trunk by means of at least one member of the trunk components set 544 or monitoring device set 358. When unvalidated the control module 104 or web server 110 can generate, transmit or terminate a unauthorized code 540 or pin to automatically or manually lock a vehicle trunk through at least one member of the trunk components set 544 or monitoring device set 358. In some embodiments, the vehicle security system's control module 104 is programmed to generate an authenticated command code 542 to lock and unlock a vehicle trunk through one member of a monitoring device set 358 consisting of: a monitoring device and a registered monitoring device.

In some embodiments, devices to interact with the vehicle trunk include the third party registered device set 532 consisting of: a retailer computing device, a delivery computing device, a mobile phone, a tablet, a smartwatch, a smartphone, a smart TV, a mobile device. In some embodiments, devices to interact with the vehicle trunk include the user mobile device set 528 consisting of: a retailer computing device, a delivery computing device, a mobile phone, a tablet, a smartwatch, a smartphone, a smart TV, a mobile device. Then, in an exemplary embodiment the bar scanning tool is programmed with bar scanning tool instructions to: locate the vehicle with a global positioning system, communicate location of the vehicle to a user mobile device set verify the vehicle, verify a first product, verify a second product, scan a second command barcode, scan a first command barcode, unlock the vehicle trunk and communicate unlocking the vehicle trunk to the user mobile device. Then, communication for successful interaction with the trunk, such as unlocking the vehicle trunk, are communicated to the user mobile device set 528 further comprising: communicating a video feed from the first image capture device to the web server; communicating a video feed web server to the user mobile device set for five seconds before and five seconds after unlocking the vehicle trunk. In some embodiments, this also includes communicating the video feed from the first image capture device to the video feed web server or communicating the video feed web server to the user mobile device set for five seconds before and five seconds after unlocking the vehicle trunk.

In some embodiments, the vehicle security system is further controlled by a third party. The third party is at least one member of a third-party set 530 consisting of: a package delivery personnel, a mail carrier personnel, a delivery service personnel, a robotic computerized delivery system, an artificial intelligence computerized delivery system, an order processing web server, and an authorized vehicle user. To prevent a third party registered device from opening the vehicle trunk, the control module 104 is programmed to deactivate, invalidate or cancel a command code when the vehicle trunk is closed; this prevents a third party registered device from opening the vehicle trunk when third party opening the trunk cannot be validated. Further, the control module 104 in some embodiments may be programmed to re-generate at least one more new authorized command codes 542 upon an input from at least one member of a device code set 534 consisting of: a vehicle owner, an authorized user, the monitoring device, and the registered monitoring device.

In some embodiments, depending on the position of the trunk any member of the trunk components set may be turned on or off if the trunk is open or closed. In some embodiments, this is also controlled by any one member of the listed auxiliary members 106.

In some embodiments, the control module 104 is communicatively coupled to an artificial intelligence device 552. In some embodiments, the control module 104 may internally contains an artificial intelligence device 552. Then, the artificial intelligence device 552 programmed to interact with one member of a user mobile device set 528 consisting of: a vehicle owner 529 or a member of the authorized user mobile device set 531. Then, upon detection of at least one member of an unauthorized activity set 550 or any one event of the event set 316, the artificial intelligence device 552 can notify at least one member of the distress monitoring set 554, or notify at least one member of the user mobile device set 528. The unauthorized activity set 550 consisting of: a digital intrusion, hacking, a login into a vehicle key fob, a login into a monitoring device, and a login into a registered monitoring device. In some embodiments, the control module 104 cumulatively coupled with an artificial intelligence device 552 is further programmed to record, capture or scan a license plate of another vehicle behind when the another vehicle continuously follows the vehicle as it changes locations or frequently turns to different locations. In some embodiments, an member of the user mobile device set 528 sends a panic alert message through the control module 104 to any one member of a distress monitoring set 559 consisting of: a registered monitoring device, a central monitoring station and a law enforcement officer when the driver is being continuously followed by another vehicle.

In some embodiments, the vehicle security system comprises a graphic user interface 112, communicatively coupled through a communication network 111 to any of the following: to the first image capture device 101, any one member of the auxiliary members 106, sensors 102, a portable mobile device 524, control module 104 and the microprocessor 115. The graphical user interface 112 is programmed with graphic user interface instructions 526 to: access a ridesharing website; access a ridesharing app; order a ridesharing vehicle; accept a passenger request, accept a ridesharing pickup request; and request the ridesharing vehicle. These ridesharing apps include, but are not limited to, the following: Lyft, Uber, Carma, BlaBlaCar, Relay Rides, Sidecar, Ridejoy, Getaround, Justshareit, Zimride, Zipcar and other rideshare providers. Then, at least one graphic user interface 112 connects to a portable mobile device 524 of one or more passengers or the driver and the graphic user interface is programmed with further graphic user interface provides instructions to pair with the first image capture device 101, the sensors 102, and the microprocessor 115.

In some embodiments, at least one graphic user interface 112 can send live video from the first image capture device to at least one event to one member of the distress monitoring set 559 consisting of: law enforcement, a central monitoring station, a registered mobile device, emergency contacts registered mobile device of at least on passenger and the driver.

In some embodiments one or more graphical user interfaces 112 may also include further automated communication actions triggered by at least one event of the distress event set 317, at least one event of the event set 316, upon successfully communication with the distress monitoring set 559 or unsuccessfully attempt for communication with the distress monitoring set 559. In some embodiments, the vehicle security system 100 may communicate in any direction with at least one member of distress monitoring set 559. The distress event set 317 consisting of: trigger a vehicle alarm, control a light sensor, detect ambient light, activate light emitting diodes attached to the vehicle or present another graphical user interface to manually trigger an alarm 560.

In some embodiments, one or more graphic user interfaces 112 can control the first image capture device direction of view, angle, zoom or lens characteristics.

In some embodiments, a one or more graphical user interfaces 112 may enable two-way communication with the third party mobile device; and communicate live video, live audio, captured images and a GPS location to the third party. Then, one or more graphical user interfaces 112 may enable the user to pause, allow, disable, stop, start or re-start the means of communication. One or more graphical user interfaces 112 may also enable the user to pause, allow, disable, stop, start or re-start the video call when the first image capture device captures another image, other than a caller's image.

In some embodiments, during communication with any member of the vehicle security system 100, through one of more graphical user interfaces 112 or the artificial intelligence device 552 may manipulate the image to recognize, detect, authenticate, block, blur, or tag the person on any receiving end of the images communication.

In some embodiments, the above the graphical user interfaces 112 may further detect at least one distressed passenger in the vehicle by utilizing at least one member of a distressed signal set 554 consisting of: gestures, facial recognition, and the voice recognition. Then, the distressed incident may be recorded automatically or manually into, onto or in association with the captured images or audio by tagging, recording a number, recording a name, or recording a message as having a distressed incident or event at least five seconds before a distressed signal set 554 event and at least five seconds after the distressed signal set event 554. Further action may be made by one or more graphical user interfaces 112 manually or automatically such as: storing the distressed event data on a web server 110, mute any connected devices, disconnect from any device upon reaching a destination, or provide instructions for the user to take action upon.

In some embodiments, the vehicle security system 100 or at least one graphical user interface 112 has a passenger mobile device is communicatively coupled to the portable device and operated by a passenger wherein the passenger is one member of a passenger set consisting of: a subscriber, a customer, a registered member of a ridesharing vehicle, and a graphic user interface user.

In some embodiments, the vehicle security system 100 or graphical user interface 112 has the vehicle operator wherein the vehicle operator is selected from one member of a vehicle operator set consisting of: a robotic driver, an artificial intelligence driver, a remote pilot driver, and a human driver.

In some embodiments, the vehicle security system 522 has at least one sim card communicatively coupled to at least one mobile application wherein the at least one mobile application is configured to create a communication link with at least one member of a user mobile device set 528.

In some embodiments, the vehicle security system has at least one speed sensor 510 communicatively coupled to a tachometer 512 in the vehicle and further communicatively coupled to a graphic user interface, wherein exceeding a posted speed limit 514 causes the graphic user interface to communicate a warning signal 516 to the portable device inside the vehicle; wherein when a vehicle speed is reduced the speeding warning stops or when vehicle speed is not reduced 518 the portable device sends the warning signal to a registered mobile device 520.

In some embodiments, the portable device 500 of the user, third party, vehicle operator set, or passenger set further comprises at least one graphic user interface 112 which is programmed with graphic user interface instructions 502 to: access a web server having a network coverage strength with a network coverage strength signal 504; and display the network coverage strength signal 506 on the graphic user interface. Then, one or more graphic user interfaces communicates a warning when there is a low network coverage strength or the location of the vehicle security system 508.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A vehicle security system for monitoring a vehicle and notifying a user based on an occurrence of an event, the vehicle security system comprising:

a vehicle starter, arranged within the vehicle and communicatively coupled to a microprocessor;

a portable device, having a portable device front side and a portable device rear side and the microprocessor therebetween;

a control module, communicatively coupled to the microprocessor;

a first image capture device, attached to the portable device front side and communicatively coupled to the microprocessor;

a second image capture device, attached to the portable device rear side and communicatively coupled to the microprocessor a microphone, attached to the portable device rear side and communicatively coupled to the microprocessor;

a speaker, attached to the portable device and communicatively coupled to the microprocessor;

a device, communicatively coupled to the control module; wherein the device is at least one member of a monitoring device set consisting of: at least one remote monitoring device and at least one registered monitoring device;

wherein the control module is programmed with instructions to:

obtain a user authentication from at least one member of a user identification set consisting of: an acoustic sound obtained by the microphone, a voice recognition obtained by the microphone, an iris recognition obtained by the first image capture device, a fingerprint recognition obtained by the first image capture device; facial recognition obtained by the first image capture device; a passcode obtained by the device.

2. The vehicle security system of claim 1, wherein the portable device is a portable rear view mirror.

3. The vehicle security system of claim 2, wherein the control module is programmed with further instructions to: indicate, on a display screen communicatively coupled to the portable device, that a passenger mobile device is monitoring a passenger compartment.

4. The vehicle security system of claim 1, wherein the portable device is a dashboard mounted device.

5. The vehicle security system of claim 4, wherein the control module is programmed with further instructions to: indicate, on a display screen communicatively coupled to the portable device, that a passenger mobile device is monitoring a passenger compartment.

6. The vehicle security system of claim 1, wherein the control module is programmed with further instructions to:
confirm the user authentication with the control module;
start the vehicle.

7. The vehicle security system of claim 1, wherein the control module is programmed with further instructions to: indicate, on a display screen communicatively coupled to the portable device, a position of the vehicle as determined by a global positioning unit.

8. The vehicle security system of claim 1, wherein the control module is programmed with further instructions to: (a) determine that detected biometrics or a passcode information are not authentic; and (b) activate a kill switch.

9. The vehicle security system of claim 1, wherein the control module is programmed with further instructions to: (a) alert an occupant of the vehicle to verify an occupant identity; (b) warning the occupant that the occupant identity was unverified; and (c) activating a kill switch.

10. The vehicle security system of claim 9, wherein the control module is programmed with additional instructions to: communicate a kill switch deactivation code from at least one member of a passcode set consisting of: a pin code, a password, a fingerprint, an iris print, the acoustic sound, a face recognition from at least one member of a monitoring set consisting of: the portable device, a monitoring device, a registered monitoring device and a central monitoring station.

11. The vehicle security system of claim 1, wherein the control module is programmed to generate an authenticated command code to lock and unlock a vehicle trunk through one member of a monitoring set consisting of a monitoring device and a registered monitoring device.

12. The vehicle security system of claim 11, wherein the control module is programmed to receive the passcode from an authorized user selected from a user mobile device set through the at least one member of the monitoring set.

13. The vehicle security system of claim 12, wherein the passcode is at least one member of a passcode set consisting of: a pin code, a password, a fingerprint, an iris print, the acoustic sound, a face recognition from at least one member of the monitoring set.

14. The vehicle security system of claim 13, wherein the control module is programmed to receive a from a third-party from the at least one member of the monitoring set in order to lock or unlock the vehicle trunk.

15. The vehicle security system of claim 14, wherein the third party is at least one member of a third-party set consisting of: a package delivery personnel, a mail carrier personnel, a delivery service personnel, a robotic computerized delivery system, an artificial intelligence computerized delivery system, an order processing web server, and an authorized vehicle user.

16. The vehicle security system of claim 11, wherein the control module is programmed to deactivate, invalidate or cancel a command code when the vehicle trunk is closed; this prevents a third party registered device from opening the vehicle trunk.

17. The vehicle security system of claim 16, wherein the control module is programmed to re-generate at least one more new command codes upon an input from at least one member of a device code set consisting of: a vehicle owner, an authorized user, the monitoring device, and the registered monitoring device.

18. The vehicle security system of claim 11, wherein the registered monitoring device is at least one member of the monitoring device set.

19. The vehicle security system of claim 18, further comprising at least one camera attached inside the vehicle trunk and at least one additional camera attached outside the trunk; wherein the at least one camera communicates to the control module when someone tries to open the vehicle trunk.

20. The vehicle security system of claim 19, wherein the at least one camera is programmed to start filming when the vehicle trunk is open.

21. The vehicle security system of claim 19, wherein the at least one camera is programmed to go into a standby mode when the vehicle trunk is closed.

22. The vehicle security system of claim 19, wherein the at least one camera is programmed to start filming upon receiving a filming start input from the at least one member of the monitoring device set.

23. The vehicle security system of claim 19, wherein the at least one camera is equipped with a night vision to clearly see inside the vehicle trunk when closed through a filming start input from the at least one member of the monitoring device set.

24. The vehicle security system of claim 19, wherein the at least one camera is equipped with a speaker and the microphone for two-way communication between vehicle owner and someone standing by the vehicle trunk.

25. The vehicle security system of claim 1, wherein the control module is communicatively coupled to an artificial intelligence device.

26. The vehicle security system of claim 25, wherein the artificial intelligence device is programmed to interact with one member of a user mobile device set consisting of a vehicle owner and an authorized user.

27. The vehicle security system of claim 26, wherein the control module is further programmed via a communication network to:
detect at least one member of an unauthorized activity set consisting of: a digital intrusion, hacking, a login into a vehicle key fob, a login into a monitoring device, and a login into a registered monitoring device;
notify at least one member of the monitoring device set consisting of: the portable device, a monitoring device, the registered monitoring device, and a central monitoring station; and
notify at least one member of the user mobile device set consisting of: the vehicle owner and the authorized user.

28. The vehicle security system of claim 27, wherein the control module is further programmed to record, capture or scan a license plate of another vehicle behind when another vehicle continuously follows the vehicle as it changes locations or frequently turns to different locations.

29. The vehicle security system of claim 25, wherein the control module alerts a driver of the vehicle that the driver is being continuously followed by another vehicle.

30. The vehicle security system of claim 25, wherein a driver sends a panic alert message to one member of a monitoring set consisting of a registered monitoring device, a central monitoring station and a law enforcement officer.

31. The vehicle security system of claim 1, further comprising a graphic user interface, communicatively coupled to the first image capture device, a sensor, the portable device, and the microprocessor, and programmed with graphic user interface instructions to:
   access a ridesharing website;
   access a ridesharing app;
   order a ridesharing vehicle;
   accept a passenger request
   accept a ridesharing pickup request; and
   request the ridesharing vehicle.

32. The vehicle security system of claim 31, wherein the graphic user interface connects to a mobile device of one or more passengers and a mobile device of a driver inside the vehicle; wherein the graphic user interface is programmed with further graphic user interface instructions to: pair with the first image capture device, the sensor, and the microprocessor; and record a video.

33. The vehicle security system of claim 32, wherein the graphic user interface is programmed with additional graphic user interface instructions to send live video from the first image capture device of at least one event from the event set to one member of a distress monitoring set consisting of: law enforcement, a central monitoring station, a registered mobile device and an emergency contacts registered mobile device of at least one passenger and the driver.

34. The vehicle security system of claim 32, wherein the graphic user interface is programmed with additional graphic user interface instructions to trigger the distress event set to activate a vehicle alarm with emergency blinking lights activated through a panic alert button on the graphic user interface.

35. The vehicle security system of claim 34, the distress event set further triggered by a light sensor, communicatively coupled to the portable device wherein the microprocessor is further programmed with further instructions to:
   discern that there is low ambient light;
   active the vehicle alarm; and
   activate light emitting diodes electrically coupled to the vehicle.

36. The vehicle security system of claim 32, further comprising a third party mobile device, communicatively coupled to the vehicle security system; wherein the microprocessor is programmed with further instructions to:
   enable two-way communication with the third party mobile device; and
   communicate live video, live audio, captured images and a GPS location to the third party mobile device.

37. The vehicle security system of claim 32, further comprising a pan-tilt bracket attached to the first image capture device, wherein the graphic user interface is communicatively coupled to the pan-tilt bracket and programmed additional graphic user interface instructions to adjust a pan-tilt setting of the pan-tilt bracket.

38. The vehicle security system of claim 37, wherein the graphic user interface is configured to adjust a zoom setting of the first image capture device.

39. The vehicle security system of claim 38, wherein the graphic user interface is programmed with supplemental graphic user interface instructions to make a video call to a third party mobile device.

40. The vehicle security system of claim 39, wherein the graphic user interface is configured to pause (or to blur) the video call when the first image capture device captures another image, other than a caller's image.

41. The vehicle security system of claim 39, wherein the graphic user interface is configured to blur the video call when the first image capture device captures another image, other than a caller's image.

42. The vehicle security system of claim 40, further comprising a plurality of graphic user interfaces synced to a single camera wherein a video call feature is disabled until the plurality of graphic user interfaces allow the video call feature.

43. The vehicle security system of claim 42, wherein at least one of the plurality of graphic user interfaces elects to blur a facial appearance of the user.

44. The vehicle security system of claim 39, wherein the graphic user interface is configured to blur the video call when the first image capture device captures another image, other than a caller's image.

45. The vehicle security system of claim 41, wherein the graphic user interface is programmed with additional further graphic user interface instructions to:
   recognize an individual's face;
   blur the individual's face on the graphic user interface.

46. The vehicle security system of claim 45, wherein the graphic user interface is programmed with more additional graphic user interface instructions to:
   detect at least one distressed passenger in the vehicle by utilizing at least one member of a distressed signal set consisting of: gestures, facial recognition, and the voice recognition.

47. The vehicle security system of claim 32, wherein the graphic user interface is programmed with more graphic user interface instructions to tag a recorded video as having a distressed incident at least five seconds before a distressed signal set event and at least five seconds after the distressed signal set event and store the video in a web server.

48. The vehicle security system of claim 32, wherein the graphic user interface is programmed with further additional graphic user interface instructions to manually tag a recorded video as having a distressed incident at least five seconds before a distressed signal set event and at least five seconds after the distressed signal set event and store the videos in a web server.

49. The vehicle security system of claim 48, wherein the graphic user interface is further programmed with more additional graphic user interface instructions to: record a number, a name, and a message from a user who is present during the distressed signal set event.

50. The vehicle security system of claim 48, wherein the graphic user interface is further programmed with additional further graphic user interface instructions to: take a report of what occurred in the vehicle by the user during the distressed signal set event.

51. The vehicle security system of claim 50, wherein a distressed event video is stored on a web server that cannot be accessed by the graphic user interface.

52. The vehicle security system of claim 50, wherein a phone call received through a connected mobile device mutes the connected mobile device from audio recording.

53. The vehicle security system of claim 50, wherein the graphic user interface is further programmed with further more graphic user interface instructions to automatically disconnect from the portable device upon reaching a destination.

54. The vehicle security system of claim 50, wherein the graphic user interface is further programmed with additional more graphic user interface instructions to manually disconnect from the portable device upon a manual input from the graphic user interface.

55. The vehicle security system of claim 1, wherein the vehicle is one member of a vehicle set consisting of: a traditional vehicle, an autonomous vehicle, a robotic vehicle, an artificial intelligence vehicle, a vehicle used for ridesharing, an automobile used for or fleet management.

56. The vehicle security system of claim 1, further comprising a passenger mobile device communicatively coupled to the portable device and operated by a passenger wherein the passenger is one member of a passenger set consisting of: a subscriber, a customer, a registered member of a ridesharing vehicle, and a graphic user interface user.

57. The vehicle security system of claim 1, further comprising a vehicle operator wherein the vehicle operator is selected from one member of a vehicle operator set consisting of: a robotic driver, an artificial intelligence driver, a remote pilot driver, and a human driver.

58. The vehicle security system of claim 1, further comprising at least one sim card communicatively coupled to at least one mobile application wherein the at least one mobile application is configured to create a communication link with at least one member of a user mobile device set consisting of: a mobile device, a registered mobile device, a central monitoring stating, and a law enforcement unit.

59. The vehicle security system of claim 1, further comprising at least one speed sensor communicatively coupled to a tachometer in the vehicle and further communicatively coupled to a graphic user interface, wherein exceeding a posted speed limit causes the graphic user interface to communicate a warning signal to the portable device inside the vehicle; wherein when a vehicle speed is reduced the speeding warning stops.

60. The vehicle security system of claim 1, further comprising at least one speed sensor communicatively coupled to a tachometer in the vehicle and further communicatively coupled to a graphic user interface, wherein exceeding a posted speed limit causes the graphic user interface to communicate a warning signal to the portable device inside the vehicle; wherein when vehicle speed is not reduced the portable device sends the warning signal to a registered mobile device.

61. The vehicle security system of claim 60, wherein the graphic user interface is programmed with further graphic user interface instructions to set up a two-way video communication between the portable device and with one member of a user mobile device set consisting of: a mobile device, the registered mobile device, a central monitoring stating, and a law enforcement unit.

62. The vehicle security system of claim 1, further comprising a sensor, communicatively coupled to the portable device wherein the sensor is at least one member of a sensor set consisting of: a gesture sensor, a facial recognition sensor, an Iris sensor, an acoustic sensor, an image blurring sensor, and a light sensor.

63. The vehicle security system of claim 1, further comprising a web server, communicatively coupled to a vehicle trunk; wherein the web server is programmed to generate a one-time use command code; wherein a delivery personal uses the one-time use command code to open the vehicle trunk and safely store a package.

64. The vehicle security system of claim 63, wherein closing the vehicle trunk is opened by a pin code communicated by one member of the monitoring device set.

65. The vehicle security system of claim 63, further comprising a generated command barcode, RFID tag, beacon, or proximity sensor created by the web server and attached to the package; wherein scanning the generated command barcode, RFID tag, beacon, or proximity sensor proximate to the vehicle trunk causes the vehicle trunk to open.

66. The vehicle security system of claim 65, wherein the generated command barcode is printed on a label further comprising: a vehicle make, a vehicle model, a license plate, a color, and a location of the vehicle.

67. The vehicle security system of claim 66, further comprising a bar scanning tool; wherein the bar scanning tool is selected from one member of a third party registered monitoring device set consisting of: a retailer computing device, a delivery computing device, a mobile phone, a tablet, a smartwatch, a smartphone, a smart TV, a mobile device; wherein the bar scanning tool is programmed with bar scanning tool instructions to:
  locate the vehicle with a global positioning system;
  communicate location of the vehicle to a user mobile device;
  verify the vehicle;
  verify a first product;
  scan a first command barcode;
  unlock the vehicle trunk;
  communicate unlocking the vehicle trunk to the user mobile device.

68. The vehicle security system of claim 67, wherein communication for unlocking the vehicle trunk to the user mobile device set further comprises:
  communicating a video feed from the first image capture device to the web server;
  communicating a video feed web server to the user mobile device set for five seconds before and five seconds after unlocking the vehicle trunk.

69. The vehicle security system of claim 68; wherein the bar scanning tool is programmed with further bar scanning tool instructions to:
  verify a second product
  scan a second command barcode;
  unlock the vehicle trunk;
  communicate unlocking the vehicle trunk to the user mobile device.

70. The vehicle security system of claim 69, wherein communicate unlocking the vehicle trunk to the user mobile device set further comprises:
  communicating the video feed from the first image capture device to the video feed web server;
  communicating the video feed web server to the user mobile device set for five seconds before and five seconds after unlocking the vehicle trunk.

71. The vehicle security system of claim 1, wherein the portable device further comprises a graphic user interface which is programmed with graphic user interface instructions to:
  access a web server having a network coverage strength with a network coverage strength signal; and
  display the network coverage strength signal on the graphic user interface.

72. The vehicle security system of claim 71, wherein the graphic user interface communicates a warning when there is a low network coverage strength.

73. The vehicle security system of claim 72, wherein the graphic user interface utilizes network cover strength to determine a location of the vehicle security system.

74. The vehicle security system of claim 1, wherein the control module is programmed to:
 detect a vehicle accident impact; and
 automatically send a live video alert to one member of a live video alert set consisting of the monitoring device set, a professional medical assistant, and a local authority.

* * * * *